(12) United States Patent
Kim et al.

(10) Patent No.: US 9,312,710 B2
(45) Date of Patent: Apr. 12, 2016

(54) CHARGING CRADLE FOR A HEADSET DEVICE AND AN EARPHONE COVER FOR THE HEADSET DEVICE

(71) Applicant: Samsung Electronics Co., Ltd., Gyeonggi-do (KR)

(72) Inventors: Dong-Kyu Kim, Gyeonggi-do (KR); Beom-Ku Han, Seoul (KR); Chang-Soo Lee, Incheon (KR)

(73) Assignee: Samsung Electronics Co., Ltd. (KR)

( * ) Notice: Subject to any disclaimer, the term of this patent is extended or adjusted under 35 U.S.C. 154(b) by 119 days.

(21) Appl. No.: 14/104,329

(22) Filed: Dec. 12, 2013

(65) Prior Publication Data

US 2014/0098970 A1    Apr. 10, 2014

Related U.S. Application Data

(62) Division of application No. 11/787,416, filed on Apr. 16, 2007, now Pat. No. 8,611,578.

(30) Foreign Application Priority Data

Oct. 13, 2006 (KR) .................. 10-2006-0099872

(51) Int. Cl.
| | |
|---|---|
| *H04R 1/10* | (2006.01) |
| *H02J 7/00* | (2006.01) |
| *H04M 1/05* | (2006.01) |
| *H04M 1/06* | (2006.01) |

(52) U.S. Cl.
CPC ............... *H02J 7/0044* (2013.01); *H04M 1/05* (2013.01); *H04M 1/06* (2013.01); *H04R 1/1091* (2013.01)

(58) Field of Classification Search
CPC .............................. H04R 5/033; H04R 1/1041
See application file for complete search history.

(56) References Cited

U.S. PATENT DOCUMENTS

| | | |
|---|---|---|
| 1,893,143 A | 1/1933 | Koch |
| 5,544,253 A | 8/1996 | Nagayoshi et al. |
| 5,712,453 A | 1/1998 | Bungardt et al. |
| 6,819,762 B2 | 11/2004 | Jones et al. |
| 7,068,803 B2 | 6/2006 | Kuhlmann et al. |
| 7,536,008 B2 | 5/2009 | Howes et al. |
| 7,985,803 B2 | 7/2011 | Yonezawa et al. |

(Continued)

FOREIGN PATENT DOCUMENTS

| | | |
|---|---|---|
| JP | 09-009382 | 1/1997 |
| JP | 2006-203420 | 8/2006 |
| KR | 1992-0007036 | 9/1992 |
| KR | 20-0375295 | 1/2005 |

*Primary Examiner* — Simon King
(74) *Attorney, Agent, or Firm* — The Farrell Law Firm, P.C.

(57) ABSTRACT

Disclosed is a charging cradle for a headset device, which includes a housing with a surface providing a mounting depression, and a cover with a transparent surface pivotably connected to the housing so as to open and close the mounting depression. The headset device is mounted in the mounting depression so as to charge an internal battery pack provided in the headset device. The cradle protects the headset device under charging, enabling the user to observe the charging state without opening it. An earphone cover for a headset device includes a projected semi-circular fixing ring for preventing the earphone from being removed from the ear. The earphone cover is provided in various sizes to fit a user's ear size, and may be rotated to change the rotational position of the fixing ring so as to enable the user to put the headset device selectively on the right or left ear.

8 Claims, 8 Drawing Sheets

(56) References Cited

U.S. PATENT DOCUMENTS

| | | |
|---|---|---|
| 8,121,325 B2 | 2/2012 | Atamaniuk et al. |
| 2008/0012536 A1* | 1/2008 | Glass .................... H02J 7/0042 320/165 |
| 2008/0044001 A1* | 2/2008 | Kim .................... H04M 1/0283 379/428.02 |
| 2008/0132293 A1* | 6/2008 | Gundlach ........... H04M 1/0258 455/569.1 |
| 2008/0144877 A1 | 6/2008 | Ham et al. |

\* cited by examiner

CHARGING CRADLE FOR A HEADSET DEVICE AND AN EARPHONE COVER FOR THE HEADSET DEVICE

PRIORITY

This application is a Divisional Application of U.S. application Ser. No. 11/787,416, which was filed in the U.S. Patent and Trademark Office on Apr. 16, 2007, and claims priority under 35 U.S.C. §119 to an application entitled "Charging Cradle for a Headset Device and an Earphone Cover for the Headset Device" filed in the Korean Intellectual Property Office on Oct. 13, 2006 and assigned Serial No. 10-2006-0099872, the contents of each of which are incorporated herein by reference.

BACKGROUND OF THE INVENTION

1. Field of the Invention

The present invention relates to a headset device, and more particularly to a charging cradle for a headset device and an earphone cover for the headset device.

2. Description of the Related Art

Originally, the mobile communications terminal was developed in order to provide the user with a portable means to communicate, such as by voice communication and short messages through a radio communications system, but nowadays it has been developed to provide wide varieties of communication services including video phone services, multimedia services and mobile banking with the help of highly advanced communication technologies. Moreover, the combination of the antenna and Bluetooth® ("Bluetooth") technologies has even enabled the user to employ a headset to perform wireless communications without manually operating the mobile terminal.

Generally, the headset device is an attachment for holding an earphone, microphone and transmitter at the user's head, which converts electrical sound signals from a sound instrument into sound waves, or the user's voice into corresponding electrical signals delivered to the sound instrument or the mobile terminal. Accordingly, such a headset device has been very useful for such people as telemarketers and people chatting on the Internet.

As the range of mobile communications services including multimedia services extensively increases, the functions of the mobile communication terminal is also extensively diversified, making the user more frequently employ the headset device involving the Bluetooth technologies. Accordingly, the headset includes a battery pack that must be recharged before being completely discharged. To this end, the headset is provided with a power connection terminal connected with an external power supply to recharge the battery pack. However, the conventional power connection terminal provided in the headset is formed like a groove so as to limit the reduction of its size. In addition, the convention headset device must be directly connected to an external power source to recharge the battery, and is therefore exposed to external damage. Besides, the headset is not securely fixed during charging, is inconvenient for inspecting the charging state, and is not easily adaptable to various ear sizes.

SUMMARY OF THE INVENTION

It is an aspect of the present invention to provide a charging cradle for a headset device that may protect the headset device from external damage and facilitate the inspection of the charging state.

It is another aspect of the present invention to provide a headset device with an earphone cover enabling the headset device to be adapted to various ear sizes.

According to an aspect of the present invention, a charging cradle for a headset device comprises a housing with a surface providing a mounting depression, and a cover with a transparent surface pivotably connected to the housing so as to open and close the mounting depression, wherein the headset device is mounted in the mounting depression so as to charge an internal battery pack provided in the headset device.

According to another aspect of the present invention, an earphone cover for a headset device provided with a microphone and an earphone includes an earphone cover part detachably attached to the earphone, and a fixing ring integrally formed with the earphone cover part, wherein the fixing ring prevents the earphone from being removed from the ear when the headset device is mounted on the ear.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENT

Figure 1:
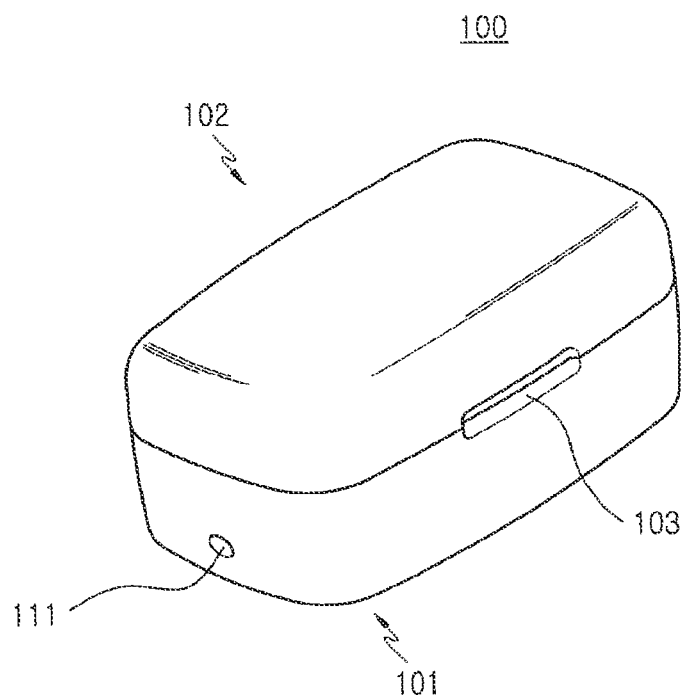
FIG. 1 is a perspective view of a charging cradle for a headset device according to a first embodiment of the present invention.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

Figure 2:
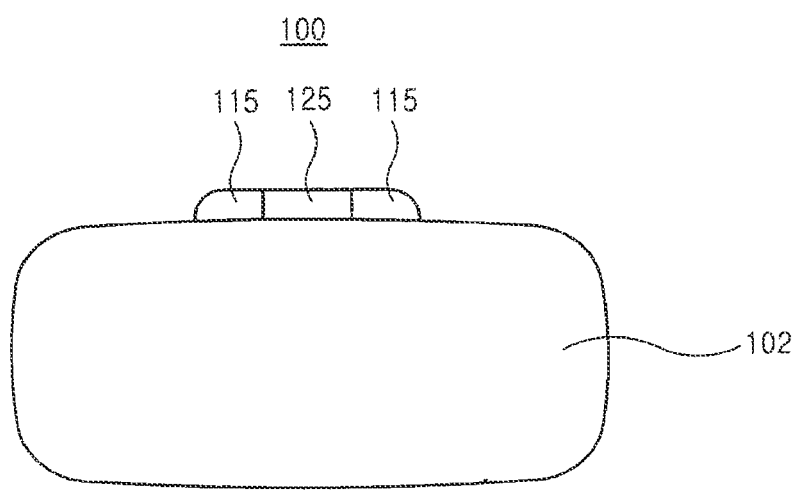
FIG. 2 is a plane view of the charging cradle shown in FIG. 1.
Figure 3:
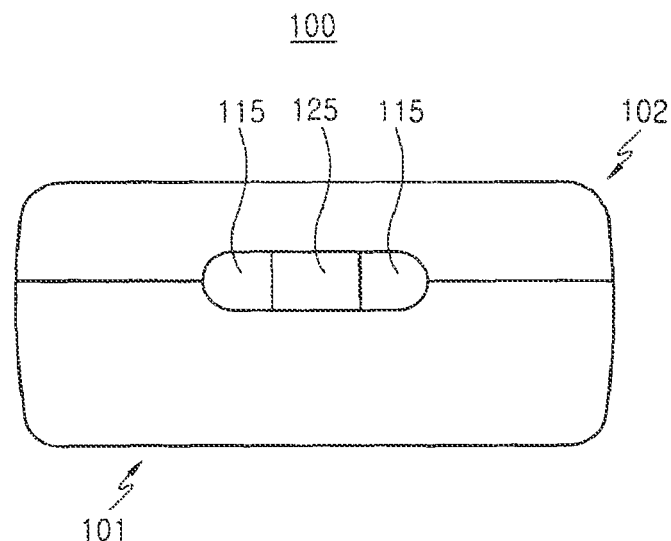
FIG. 3 is a front view of the charging cradle shown in FIG. 1.
Figure 4:
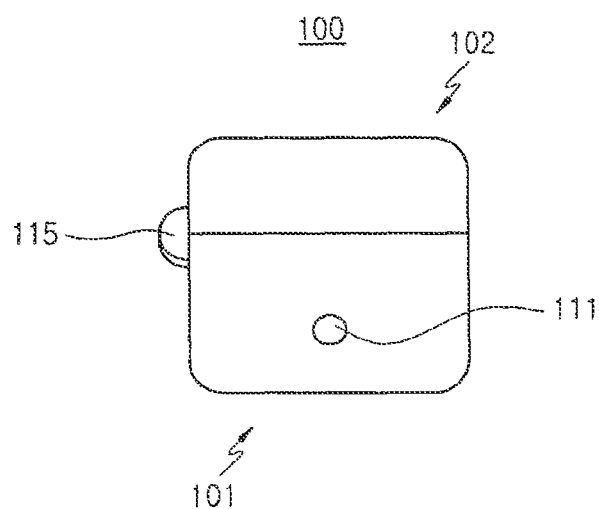
FIG. 4 is a left side view of the charging cradle shown in FIG. 1.
Figure 5:
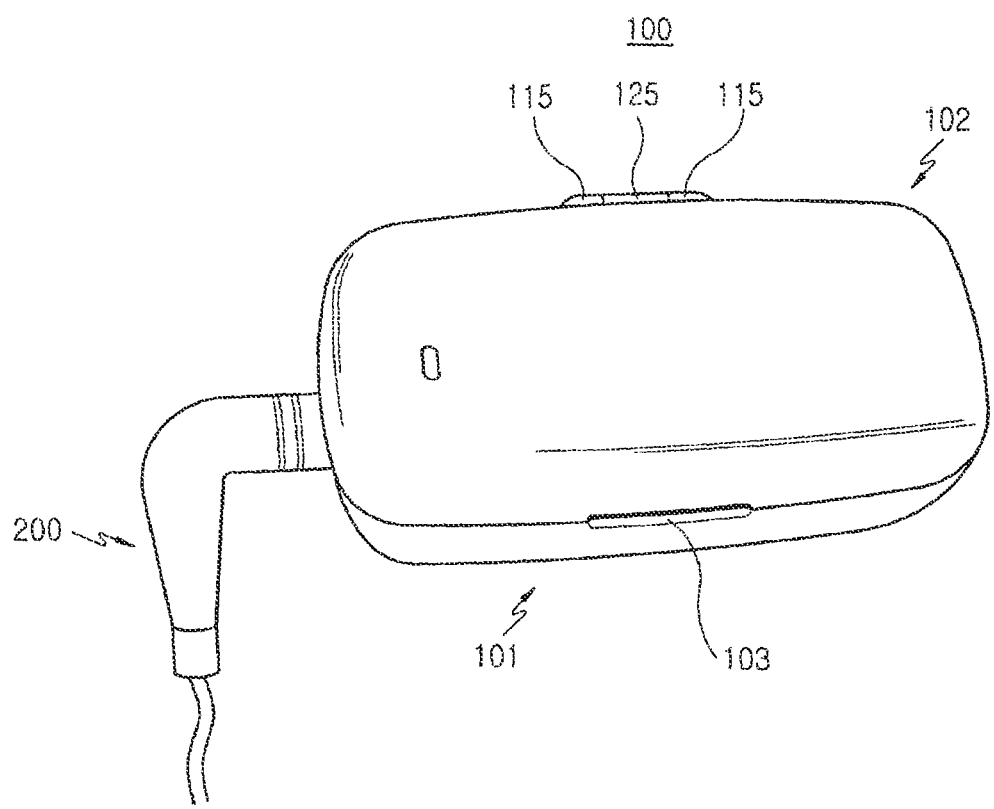
FIG. 5 is a perspective view of the charging cradle shown in FIG. 1 containing a headset device.
Figure 6:
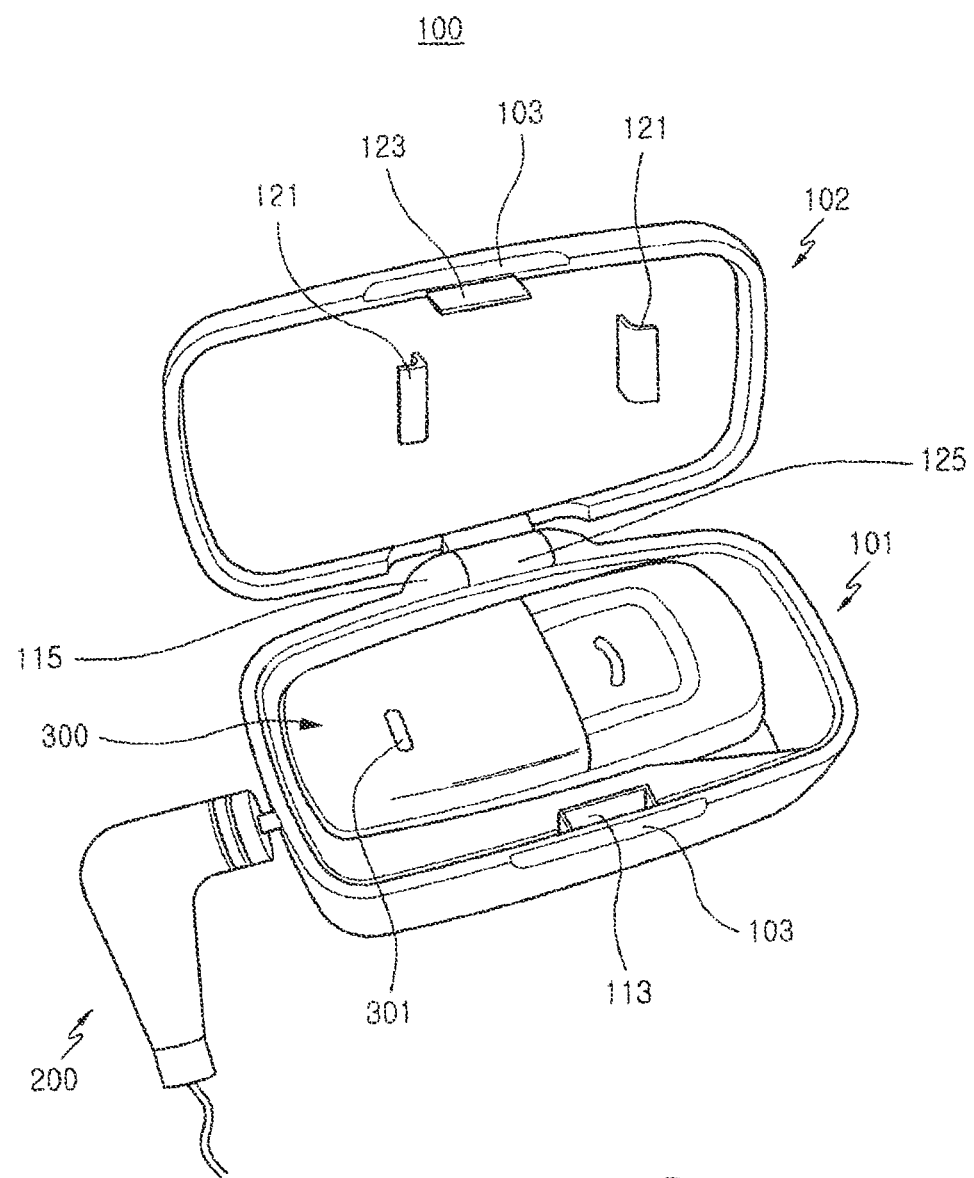
FIG. 6 is a perspective view of the charging cradle of FIG. 5 opened to expose the contained headset device.

Referring to FIGS. 1 to 6, a charging cradle 100 for a headset device 300 comprises a housing 101 and a cover 102. The housing 101 is provided with a mounting depression (not shown) shaped so as to fit the headset device 300. The headset device 300 is inserted in the mounting depression of the housing 101. The mounting depression is provided with charging terminals (not shown) contacting corresponding charging connection terminals (not shown) provided in the headset device 300.

The housing 101 preferably has one side provided with an electric connection terminal 111 to be connected to an external power supply 200, so that the external power supply 200 may supply the housing 101 with electric power to charge the headset device 300. The housing 101 also has a side with an edge provided with a fastening groove 113 and an opposite side provided with a pair of side hinge arms 115 with a space between them.

The cover 102 has a side hinged to one side of the housing 101 to open/close the mounting depression. The inside of the cover is provided with buffer projections 121 for buffering the cover 102 against the headset device 300 when closing the housing 101. Namely, the buffer projections 121 serve to stably position the headset device 300 between the cover 102 and the mounting depression in the charging cradle 100.

The cover 102 preferably also has a transparent surface part or window (not shown) to enable the user to observe the headset device 300 mounted in the housing 101 without opening the cover. Hence, if an indicator lamp 301 provided in the headset device 300 generates a light, the user may observe the charging state of the headset device 300 through the transparent surface part of the cover 102.

A fastening member 123 is formed at the edge of a side of the cover 102 so as to engage the fastening groove 113 when the cover has closed the housing 101. The side of the cover 102 opposite to the fastening member 123 is provided with a center hinge arm 125 connected between the side hinge arms 115 so as to pivotably move the cover 102 away from and toward the housing 101. Thus, when the cover 102 is pivoted by means of the center hinge arm 125 and side hinge arms 115 to close the housing 101, the headset device 300 is stably maintained in the housing 101.

An opening groove 103 is provided adjacent to the fastening groove 113 and fastening member 123 in one side surface of each of the housing 101 and cover 102 so as to form a single depression when closing the cover against the housing 101, which allows for insertion of a user's finger to pivot the cover 102 off the housing 101. Of course, the opening groove 103 may be provided only in the side of the cover 102 if it can allow for the insertion of the finger.

In operation, the user pivots the cover 102 off the housing by means of the opening groove 103 and the center hinge arm 125 and side hinge arms 115. Then, the headset device 300 is mounted in the charging cradle 100 so as to make the charging terminals of the mounting depression contact the charging connection terminals of the headset device 300, and the electric connection terminal 111 is connected to the external power supply 200, so that the external power supply 200 may supply the housing 101 with electric power to charge the headset device 300. While the headset device 300 is being charged, the indicator lamp 301 generates a light indicating the charging state by a red or green color respectively to represent that the headset device 300 is under charging or has been fully charged.

Meanwhile, when the cover 102 is pivoted against the housing 101 containing the headset device 300, the fastening member 123 engages the fastening groove 113 so as to prevent the cover 102 from being inadvertently opened. In this case, the headset device 300 is pressed by the buffer projections 121. Thus the headset device 300 is protected stably positioned in the charging cradle 100. In addition, the transparent surface part of the cover 102 allows the user to observe the charging state indicated by the light color of the indicator lamp 301, and therefore the charging cradle 100 does not have to be provided with a separate means of indicating the charging state.

Figure 7:
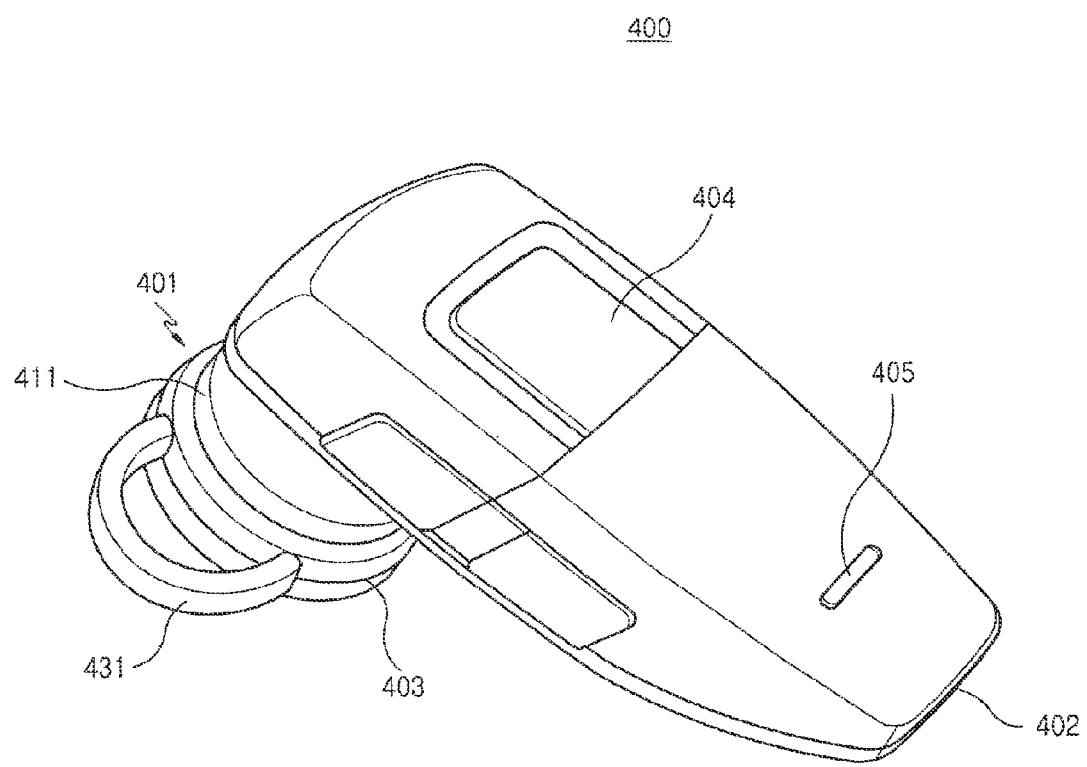
FIG. 7 is a perspective view of a headset device provided with an earphone cover according to a second embodiment of the present invention.
Figure 8:
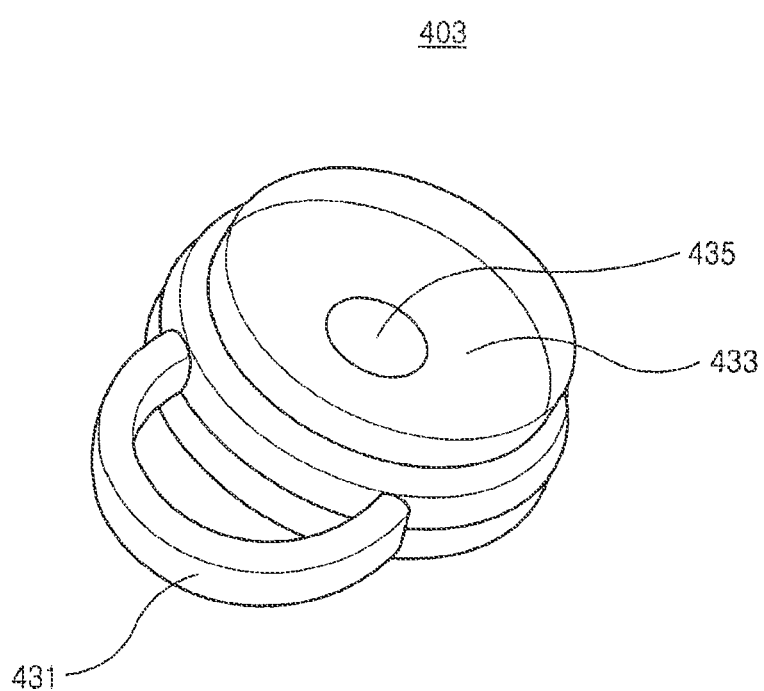
FIG. 8 is a perspective view of the earphone cover shown in FIG. 7.
Figure 9:
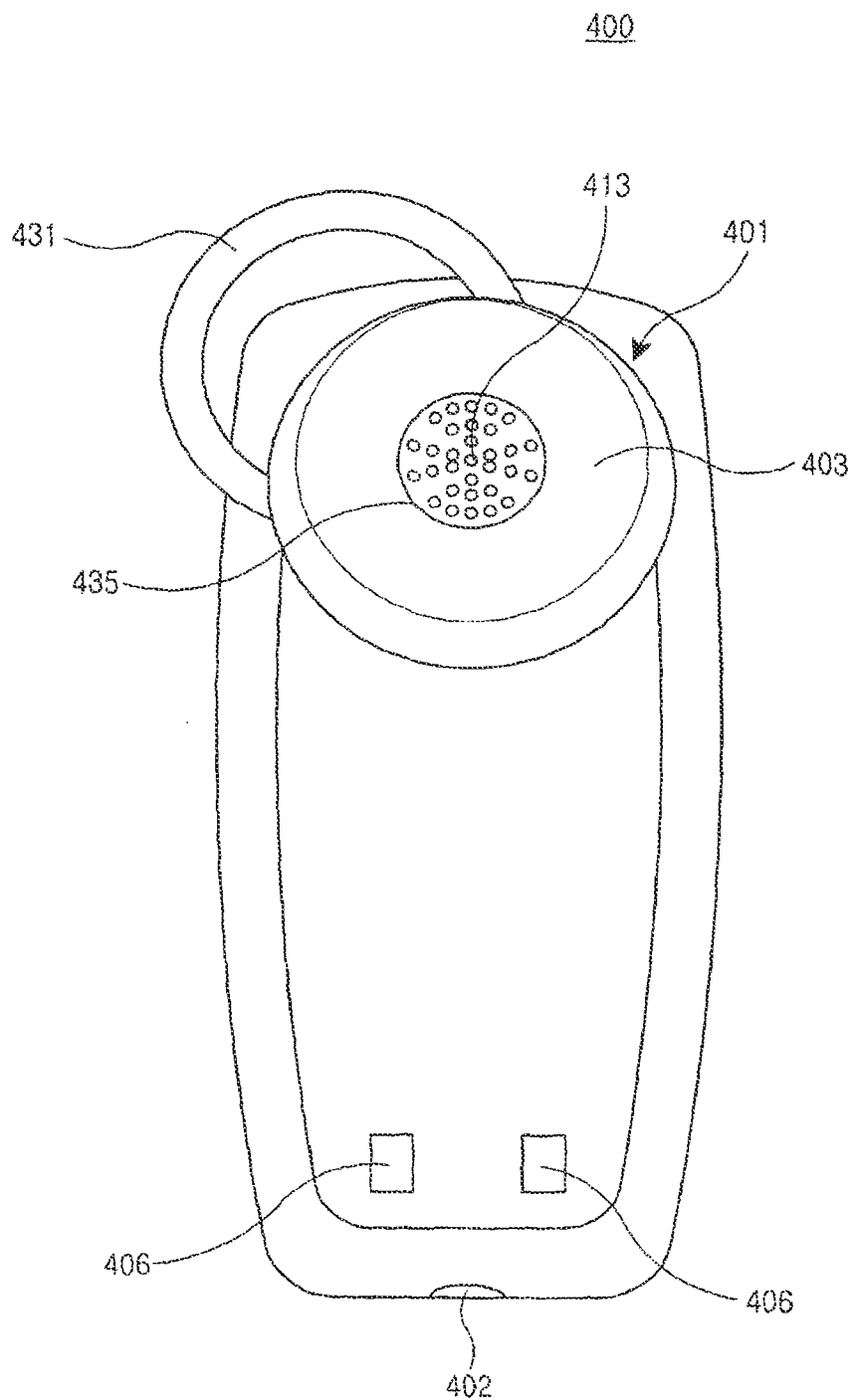
FIG. 9 is a plane view of the headset device shown in FIG. 7.
Figure 10:
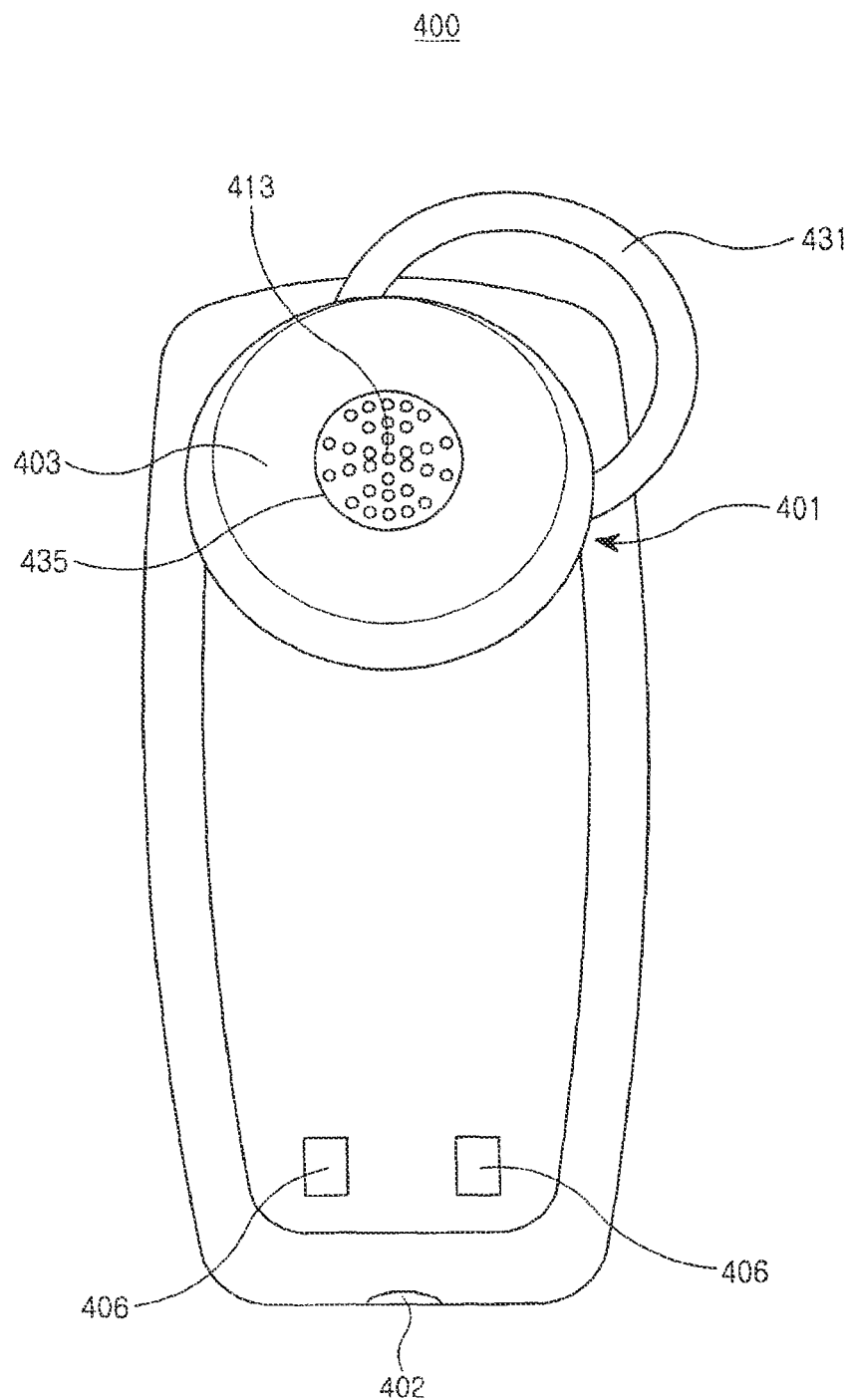
FIG. 10 is a plane view, similar to FIG. 9, with the earphone cover of the headset device arranged in a different rotational position.

Hereinafter, a more specific description of the earphone cover attached to the headset device is made in connection with FIGS. 7 to 10. The headset device 400 comprises an earphone 401 and a microphone 402, provided with a Bluetooth module for performing wireless communication with a sound instrument or mobile communications terminal. The earphone 401 includes a mounting part 411 for mounting an earphone cover part 403 thereon.

The earphone cover part 403 is rotatably and detachably mounted around the earphone 401. There may be provided one or more earphone cover parts 403 formed so as to fit various ear sizes. The earphone cover part 403 comprises a fixing ring 431, mounting groove 433, and cover hole 435. The fixing ring 431 consists of a semi-circular resilient member projecting around the earphone cover part 403 so as to be resiliently held by the ear, preventing the headset device 400 from being removed from the ear. The fixing ring 431 may change its rotational position by rotating the earphone cover part 403 so as to enable the user to put the headset device 400 selectively on the right or left ear.

The mounting groove 433 serves to detachably attach the earphone cover part 403 to a mounting part 411 of the earphone 401, so that the user may selectively use the earphone cover part 403 according to his ear size. The cover hole 435 is formed in the mounting groove 433 so as to correspond with the earphone hole 413 of the earphone 410, so that the user may receive sound waves provided by the earphone 401 with no obstruction.

Of course, the headset device 400 contains a battery pack (not shown) charged through charging connection terminals 406 arranged adjacent to the microphone 402. It also includes an operational button 404 for switching the headset device 400 on/off, and an indicator lamp 405 for indicating the operational state of the headset device 400. Pressing the operational button 404 causes the battery pack to supply electric power to the headset device 400, lighting the indicator lamp 405 so as to generate a green or red light which respectively represents the normal operation of the headset device 400 or abnormal operation caused by insufficient electric power.

As described above, the inventive charging cradle consists of a part for mounting the headset device and a part for closing it, thereby protecting the headset device from being damaged. Moreover, the closing part is made transparent so as to enable the user to observe the charging state of the headset device by the light of the indicator lamp with no additional means. An earphone cover with the projected semi-circular fixing ring is provided for various ear sizes by the user's selection, and may be rotated to change the rotational position of the fixing ring so as to enable the user to put the headset device selectively on the right or left ear.

While the invention has been shown and described with reference to a certain preferred embodiment thereof, it will be understood by those skilled in the art that various changes in form and details may be made therein without departing from the spirit and scope of the invention.

What is claimed is:

1. A charging cradle for a headset device, comprising:
a housing with a surface providing a mounting depression;
a cover with a transparent surface pivotably connected to said housing so as to open and close said mounting depression, and a buffer means provided in a surface of said cover, wherein said headset device is mounted in said mounting depression so as to charge an internal battery pack provided in said headset device, wherein said headset device mounted in said housing is pressed by said buffer means when said cover closes said housing.

2. The charging cradle as defined in claim 1, further including an electric connection terminal provided in one side of said housing configured to connect to an external power supply.

3. The charging cradle as defined in claim 2, further including charging terminals provided in said mounting depression, and charging connection terminals provided in said headset device configured to connect to said charging terminals.

4. The charging cradle as defined in claim 2, further including an indicator lamp provided in said headset device, wherein said indicator lamp is turned on if said headset is mounted in said housing connected to said external power supply.

5. The charging cradle as defined in claim 4, wherein said cover is designed to close said housing so as to allow light of said indicator lamp of said headset device to be transmitted outside said cover.

6. The charging cradle as defined in claim 1, further including a fastening groove formed at an edge of a side of said housing, and a fastening member formed at an edge of a side of said cover, wherein said fastening member engages said fastening groove when said cover closes said mounting depression.

7. The charging cradle as defined in claim 1, further including a center hinge arm provided in one end of one of said housing and cover, and a pair of side hinge arms provided in one end of the other one of said housing and cover, wherein said cover is pivotably connected to said housing with said center hinge arm mounted between the pair of side hinge arms.

8. The charging cradle as defined in claim 1, further including an opening groove provided in one side surface of each of said housing and cover so as to allow insertion of a user's finger to pivot said cover off said housing.

* * * * *